US008527173B2

(12) United States Patent
Lacoste et al.

(10) Patent No.: US 8,527,173 B2
(45) Date of Patent: Sep. 3, 2013

(54) METHOD AND SYSTEM FOR MANAGING THE ENERGY VARIATION OF AN AIRCRAFT

(75) Inventors: Jean-Patrick Lacoste, Vincennes (FR); Jean-Jacques Boubal, Sevres (FR); Sébastien Dupont De Dinechin, Bordeaux (FR)

(73) Assignee: Dassault Aviation, Paris (FR)

( * ) Notice: Subject to any disclaimer, the term of this patent is extended or adjusted under 35 U.S.C. 154(b) by 192 days.

(21) Appl. No.: 13/070,402

(22) Filed: Mar. 23, 2011

(65) Prior Publication Data
US 2011/0238277 A1 Sep. 29, 2011

(30) Foreign Application Priority Data

Mar. 24, 2010 (FR) ...................... 10 01174

(51) Int. Cl.
*B64C 13/18* (2006.01)
(52) U.S. Cl.
USPC ........................................... 701/70
(58) Field of Classification Search
USPC ........................................... 701/70
See application file for complete search history.

(56) References Cited

U.S. PATENT DOCUMENTS

| | | | | |
|---|---|---|---|---|
| 4,536,843 | A * | 8/1985 | Lambregts | 701/3 |
| 4,912,642 | A * | 3/1990 | Larsen et al. | 701/99 |
| 4,947,096 | A * | 8/1990 | Snow | 318/586 |
| 5,079,711 | A * | 1/1992 | Lambregts et al. | 701/3 |
| 5,641,136 | A * | 6/1997 | Skow et al. | 244/191 |
| 6,062,513 | A * | 5/2000 | Lambregts | 244/175 |
| 6,246,929 | B1 * | 6/2001 | Kaloust | 701/11 |
| 6,262,674 | B1 | 7/2001 | Wyatt | |
| 7,075,457 | B1 * | 7/2006 | Chidester et al. | 340/963 |

FOREIGN PATENT DOCUMENTS

| | | |
|---|---|---|
| EP | 1 598 720 A1 | 11/2005 |
| FR | 2 316 647 | 1/1977 |
| FR | 2 334 942 | 7/1977 |
| FR | 2 344 001 | 10/1977 |
| FR | 2 888 009 | 1/2007 |

OTHER PUBLICATIONS

FR 1001173, Search Report and Opinion dated Mar. 3, 2011.
Amelink et al., "Theoretical Foundations for a Total Energy-Based Perspective Flight-Path Display," *The International Journal of Aviation Psychology* 15(3):205-231 (2005).
Catton et al., "Designing Energy Display Formats for Civil Aircraft: Reply to Amelink, Mulder, van Paassen, and Flach," *The International Journal of Aviation Psychology* 17(1):31-40 (2007).
FR 1001174, Search Report and Opinion dated Dec. 10, 2010.

\* cited by examiner

*Primary Examiner* — Thomas Tarcza
*Assistant Examiner* — Alex C Dunn
(74) *Attorney, Agent, or Firm* — Patterson & Sheridan, L.L.P.

(57) ABSTRACT

The method for managing an energy variation of an aircraft provided with at least one propulsion system, capable of generating a thrust force on said aircraft comprised in a thrust range, is characterized in that said energy variation is expressed by a size representative of said energy variation and homogenous to a gradient of the aircraft, and in that it includes steps for determining the current energy variation of said aircraft, ordering an energy variation of the aircraft, determining, as a function of said ordered energy variation, a necessary thrust force that must be generated by said propulsion system for the energy variation of the aircraft to be able to tend towards said ordered energy variation, and developing and applying a control order to said propulsion system so that it delivers said necessary thrust force.

15 Claims, 6 Drawing Sheets

METHOD AND SYSTEM FOR MANAGING THE ENERGY VARIATION OF AN AIRCRAFT

CROSS-REFERENCE TO RELATED APPLICATIONS

This application claims benefit of French patent application number 1001174, filed Mar. 24, 2010, which is herein incorporated by reference.

BACKGROUND OF THE INVENTION

1. Field of the Invention

The present invention relates to a method and system for managing an energy variation of an aircraft provided with at least one propulsion system, capable of generating a thrust force on said aircraft comprised in a thrust range.

2. Description of the Related Art

In the aircrafts according to the state of the art, the pilot manages the aircraft's energy by acting on several controls, and in particular on the gas lever and the airbrake control. The gas lever allows the pilot to control the speed of the engine(s). In response to such a command, the thrust delivered by the engine(s) varies, during a transitional period, until it reaches a stabilized value, which depends in particular on the flight point of the aircraft.

Independently, the pilot can modify the drag undergone by the aircraft in particular by modifying the configuration of the airbrakes.

The aircraft's response to these commands is generally shown in the control cabin or cockpit using several information viewing devices.

In particular, the speed of the engines can be viewed using indications in percentage of the maximum rating in the system's authority, relative both to the current speed of the engines, and the speed ordered by the pilot.

This viewing alone does not allow the pilot to determine the aircraft's energy, and in particular the variation thereof.

Aircrafts are therefore generally provided with other viewing devices dedicated in particular to steering the aircraft. These devices can be of the head-down type, i.e. arranged on the aircraft's instrument panel, and/or the head-up type.

The head-up display preferably makes it possible to superimpose information to help with aircraft handling on the outside environment seen through the canopy of the aircraft. The main indications displayed are an artificial skyline, superimposed on the actual skyline, a model symbol of the aircraft, a speed vector symbol of the aircraft, the position of which relative to the skyline indicates the gradient of the aircraft, and a symbol in the form of a chevron indicating the acceleration rate of the aircraft. Thus, when the aircraft accelerates, the chevron is above the speed vector symbol of the aircraft, and when it decelerates, the chevron is below the speed vector symbol of the aircraft.

The head-down display makes it possible to superimpose this same information for helping with aircraft handling on a virtual representation of the outside world or on a simplified representation of the world in the form of a brown uniform background for land and a blue uniform background for the sky.

These representations allow the pilot to estimate the gradient of the aircraft and its acceleration rate, in response to a rating command. However, when the pilot acts on the gas lever and/or the airbrakes, he can only view the result of his command in terms of acceleration and gradient once the rating is stabilized. Thus, the pilot must generally make changes to the control of the rating to achieve the desired acceleration and gradient.

Moreover, the pilot himself must interpret the indications in percentage of the rating to deduce the possible variation field in terms of acceleration and gradient, relative to his current flight point.

This control method and this type of display impose a heavy workload on the pilot, and can be a source of errors, due in particular to the amount of information that must be analyzed by the pilot and the difficulty of interpreting it in terms of energy.

SUMMARY OF THE INVENTION

The invention therefore aims to resolve these drawbacks, and to propose a steering method and system allowing the pilot to directly control the energy variation of the aircraft.

To that end, the invention relates to a method of the aforementioned type, characterized in that said energy variation is expressed by a size representative of said energy variation and homogenous to a gradient of the aircraft, and in that it includes the following steps:

determining the current energy variation of said aircraft;

ordering an energy variation of the aircraft;

determining, as a function of said ordered energy variation, a necessary thrust force that must be generated by said propulsion system for the energy variation of the aircraft to be able to tend towards said ordered energy variation;

developing and applying a control order to said propulsion system so that it delivers said necessary thrust force.

According to other aspects, the method for managing an energy variation of an aircraft includes one or more of the following features:

the method also includes a step for determining an energy variation range that can be achieved by the aircraft by modifying at least said thrust force generated by the propulsion system;

the method also includes a step for displaying said current energy variation, said energy variation range that can be achieved by the aircraft, and said ordered energy variation;

the aircraft includes at least one braking system capable of exerting a drag force on said aircraft, and in that the method also includes a step for determining a necessary drag force that must be exerted by said braking system so that the energy variation of the aircraft can tend towards said ordered energy variation, and a step for developing and applying a control order to said braking system so that it generates said necessary drag force;

the step for ordering an energy variation of the aircraft comprises a step for actuating an elastic return control member, and a step for determining said ordered energy variation as a function of said actuation;

the step for determining said ordered energy variation as a function of said actuation comprises the following steps:

determining a relative speed of variation of said ordered energy variation, as a function of said actuation;

determining an ordered energy variation proportion in said range upon said actuation;

determining said ordered energy variation from said ordered energy variation proportion;

the step for determining said necessary thrust force comprises determining an ordered thrust force, which must be generated by said propulsion system so that the energy variation of the aircraft can tend towards said ordered energy variation, with a constant drag force, and determining a correction that must be made to said ordered thrust force to offset variations of the drag force exerted on the aircraft;

the step for determining said necessary thrust force is carried out by means of a coupling based on the comparison between said ordered energy variation and said current energy variation;

this coupling is of the proportional and integral type.

The invention also relates to a management system of the aforementioned type, for implementing the management method according to the invention, characterized in that it comprises:

means for determining the current energy variation of said aircraft;

means for ordering an energy variation of the aircraft;

means for determining, as a function of said ordered energy variation, a necessary thrust force that must be generated by said propulsion system so that the aircraft's energy variation can tend towards said ordered energy variation; and means for developing and applying a control order to said propulsion system so that it delivers said necessary thrust force.

According to other aspects, the system for managing an energy variation of an aircraft also comprises means for determining an energy variation range that can be achieved by the aircraft by modifying at least said thrust force generated by the propulsion system.

BRIEF DESCRIPTION OF THE DRAWINGS

The invention will be better understood in light of the embodiments of the invention that will be described in reference to the appended figures, in which.

DETAILED DESCRIPTION

Figure 1:
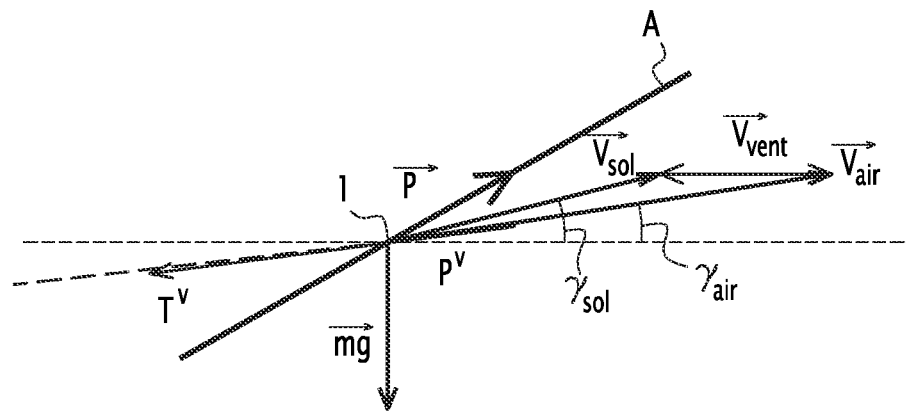
FIG. 1 diagrammatically illustrates an aircraft under traditional flight conditions, to which the invention is applied.

FIG. 1 shows, diagrammatically, an aircraft 1 in flight to which the inventive method can be applied.

This aircraft 1, shown by its sole center of gravity, is oriented along an axis A, and moves relative to the air according to a speed vector $\vec{V}_{air}$, which forms, with the horizontal, an angle $\gamma_{air}$ called the air gradient of the aircraft.

Because the air itself is in motion relative to the ground, according to vector $\vec{V}_{vent}$, the speed of the aircraft 1 relative to the ground is different from its speed relative to the air, and can be expressed by:

$$\vec{V}_{sol} = \vec{V}_{air} + \vec{V}_{vent}. \tag{1}$$

This vector $\vec{V}_{sol}$ forms, with the horizontal, an angle $\gamma_{sol}$ called the ground gradient of the aircraft.

The aircraft 1 is provided with a propulsion system, for example a set of engines, exerting a thrust force $\vec{P}$ on the aircraft, the projection of which on the axis carried by the speed vector $\vec{V}_{air}$ will be called speed axis thrust $P^V$.

A conventional speed $V_c$, or Badin, is also defined, which is the speed measured by a perfect airspeed-graduated airspeed indicator under normal temperature and pressure conditions at a null altitude.

Moreover, all of the local pressures due to the speed of the air around the aircraft in motion generate a force, called aerodynamic result, the projection of which on the axis carried by the speed vector $\vec{V}_{air}$ will be called speed axis drag $T^V$.

The aircraft 1 with mass m is also subject to its weight $m\vec{g}$.

At an altitude z, the aircraft 1 has a total mechanical energy, sum of its kinetic energy and its potential energy, that can be expressed by:

$$E_{totale} = \frac{1}{2} m V_{sol}^2 + mgz \tag{2}$$

The variation of this total energy can be expressed by the total gradient $\gamma^T$, according to the equation:

$$\gamma^T = \frac{1}{mg V_{sol}} \frac{dE_{totale}}{dt} = \gamma_{sol} + \frac{\dot{V}_{sol}}{g} \tag{3}$$

This value, homogenous at a gradient, is thus equal to the ground gradient $\gamma_{sol}$ of the aircraft 1 when its speed relative to the ground $V_{sol}$ remains constant, at the current flight conditions. A variation of the total gradient $\gamma^T$ therefore amounts to a variation of the ground gradient $\gamma_{sol}$ and/or an acceleration variation $\dot{V}_{sol}$ of the aircraft relative to the ground.

Thus, the total gradient $\gamma^T$ represents the variation of the total energy of the aircraft 1.

However, the kinetic energy most useful to the management of an aircraft's energy during flight is that relative to the air mass (and not relative to the ground).

The value used in the invention is therefore an adaptation of the total gradient, called pseudo-total gradient and designated by the symbol $\gamma^*$.

It is the ground gradient that, under current conditions, leads to a constant conventional speed. Its expression is deduced from the equations of the mechanics of the flight:

$$\gamma^* = \gamma_{sol} + \frac{\left(\frac{\partial V_{air}}{\partial V_c}\right)_{z=cste}}{1 + \frac{V_{sol}}{g} \cdot \left(\frac{\partial V_{air}}{\partial z}\right)_{V_c=cste}} \cdot \frac{\dot{V}_c}{g} = \gamma_{sol} + K \cdot \frac{\dot{V}_c}{g} \quad (4)$$

The energy to which this pseudo-total gradient is connected (in the same way the total gradient is connected to the total energy) is an adaptation of the airplane's total energy, which will simply be called "energy" in the rest of the description and in the claims.

In the embodiments presented in reference to FIGS. 2 to 15, the variation of the aircraft's energy is expressed using this pseudo-total gradient $\gamma^*$.

Figure 2:
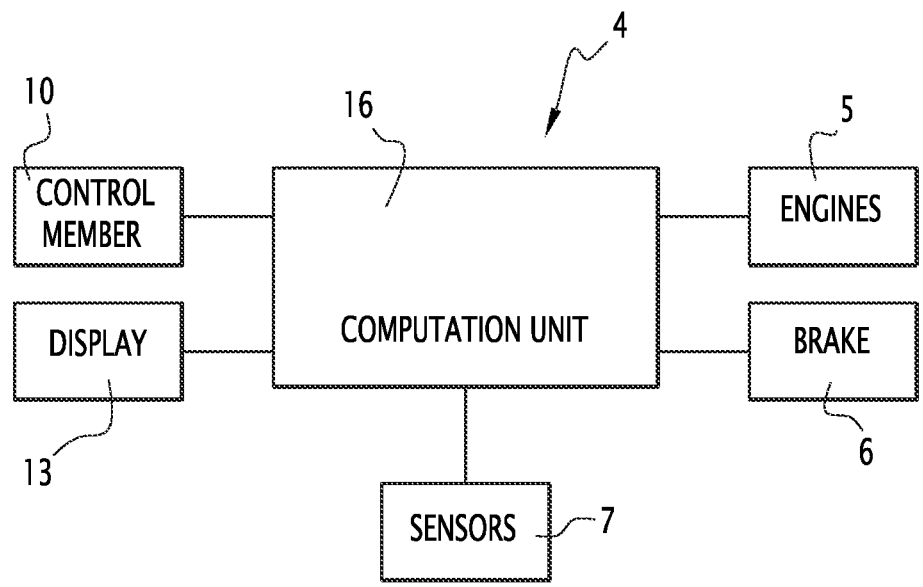
FIG. 2 is a general synoptic diagram showing the system according to the invention.

FIG. 2 shows a system 4 for controlling the energy of an aircraft 1 in a flight configuration as shown in FIG. 1.

The aircraft 1 thus includes a propulsion system 5, for example a set of engines, exerting a thrust force $\vec{P}$ on the aircraft, as well as an airbrake system 6, capable of modifying the drag force exerted by the air on the aircraft 1.

The aircraft 1 includes a plurality of sensors 7 making it possible to determine the values of flight parameters of the aircraft 1, such as its position, altitude z, speeds $V_{air}$ and $V_{sol}$ relative to the air and the ground, as well as its air $\gamma_{air}$ and ground $\gamma_{sol}$ gradients. In particular, an airspeed indicator makes it possible to determine the conventional speed $V_c$ of the aircraft.

This system also comprises a control member 10 and an information display device 13, which provide the interface between the pilot and the engines 5 and airbrakes 6 of the aircraft 1, as well as a computation unit 16, connected to the sensors 7, the control member 10, the information display device 13, the engines 5, and the airbrakes 6.

The control member 10 allows the pilot to order an energy variation of the aircraft 1, by indicating the pseudo-total gradient he wishes for the aircraft, hereinafter called the ordered pseudo-total gradient or instruction $\gamma^*_{com}$. Advantageously, this member 10 is an elastic return control lever or joystick, which can be moved around a central position in two opposite directions, called upper and lower, between two stop positions. A movement of the joystick 10 in the upper direction orders an increase of the instruction $\gamma^*_{com}$, and moving the joystick in the lower direction orders a decrease of the instruction $\gamma^*_{com}$, the increase or decrease of the instruction $\gamma^*_{com}$ being faster as the amplitude of the movement of the joystick 10 relative to its central position is larger. Moreover, the variation of the instruction $\gamma^*_{com}$ depends on the period of time during which the joystick is moved away from its central position.

The information display device 13 in particular comprises a head-up viewing device and a head-down viewing device, in particular displaying information relative to the pseudo-total gradient $\gamma^*_{com}$ ordered by the pilot and the current pseudo-total gradient $\gamma^*$ of the aircraft 1 and the range of pseudo-total gradients that the aircraft 1 can achieve.

The computation unit 16, for example a processor, is capable of determining, from flight parameters coming from sensors 7, the current pseudo-total gradient $\gamma^*$ of the aircraft 1, and determining, as a function of the thrust values that can be generated by the engines 5, and the drag force exerted on the aircraft 1 according to the position of the airbrakes 6, the range of pseudo-total gradients the aircraft 1 can achieve.

The processor 16 also comprises means for determining, as a function of the movements of the joystick 10, the value of the pseudo-total gradient $\gamma^*_{com}$ ordered by the pilot, and for determining, according to that value, the thrust that must be generated by the engines and possibly the drag that must be generated by the airbrakes. The processor 16 is also capable of controlling the engines 5, so that they generate a given thrust.

Figure 3:
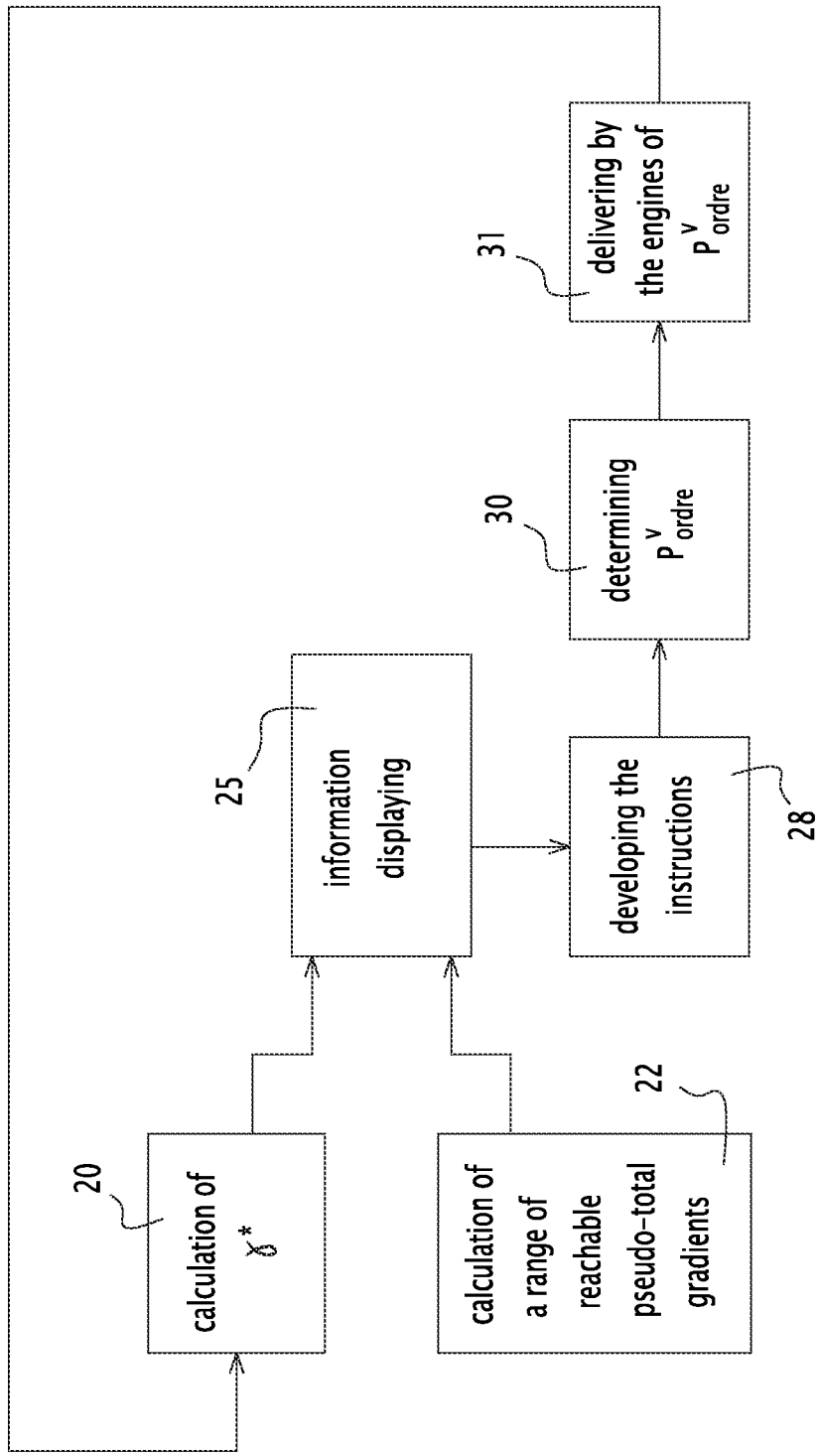
FIG. 3 is a synoptic diagram illustrating the inventive method.

FIG. 3 is a synoptic diagram illustrating the method according to the invention. This method is implemented during the flight of an aircraft 1, in a configuration as shown in FIG. 1.

During the flight of the aircraft 1, the processor 16 determines, in a step 20, the current pseudo-total gradient $\gamma^*$ of the aircraft 1. The processor 16 performs this calculation from two different expressions of the pseudo-total gradient. This can be written in the form:

$$\gamma^* = \gamma_{sol} + \frac{\left(\frac{\partial V_{air}}{\partial V_c}\right)_{z=cste}}{1 + \frac{V_{sol}}{g} \cdot \left(\frac{\partial V_{air}}{\partial z}\right)_{V_c=cste}} \cdot \frac{\dot{V}_c}{g} \quad (5)$$

This expression (5), which is sensitive to turbulence, can be approached by the expression:

$$\gamma^* = \frac{N_x^{Vsol}}{1 + \left(\frac{\partial V_{air}}{\partial z}\right)_{V_c=cst} \cdot \frac{V_{sol}}{g}} \quad (6)$$

where $N_X^{Vsol} = \frac{A_X^{Vsol}}{g}$ designates the load factor supported by the ground speed, $A_X^{Vsol}$ designating the acceleration on the axis supported by the ground speed. Expression (6) of the pseudo-total gradient is less sensitive to turbulence, and is therefore used in the short term, i.e. over durations in the vicinity of a few seconds. In the longer term, the processor uses expression (5) to calculate the current pseudo-total gradient.

In parallel to step 20, in a step 22, the processor 16 determines the range $\lfloor \gamma^*_{min\ AF}, \gamma^*_{max} \rfloor$ of the pseudo-total gradients that can be achieved by the aircraft 1, as a function of the flight parameters coming from the sensors 7, of the thrust values that can be generated by the engines 5, and the drag force $T^V$ exerted on the aircraft 1 depending on the position of the airbrakes.

The pseudo-total gradient of the aircraft 1 can be expressed in the form:

$$\gamma^* = \frac{\frac{P^V - T^V}{mg}}{1 + \frac{V_{sol}}{g} \cdot \left(\frac{\partial V_{air}}{\partial z}\right)_{V_c=cste}} \quad (7)$$

The speed axis thrust $P^V$, generated by the engines, can vary continuously between a minimum value $P_{min}^V$ and a maximum value $P_{max}^V$, passing through an intermediate value $P_{min\ AI}^V$, which is the minimum thrust value for the deicing system to be able to operate.

Moreover, the speed axis drag $T^V$ can be adjusted by the pilot by modifying the configuration of the airbrakes. This drag can vary continuously between a minimum value $T_{min}^V$ when all of the airbrakes are pulled in, and a maximum value $T_{max}^V$ when all of the airbrakes are out, as a function of the deflection by the airbrakes manually ordered by the pilot.

Thus, during step 22, the processor 16 determines, from expression (6), the minimum $\gamma^*_{min}$ and maximum $\gamma^*_{max}$ pseudo-total gradient values that the aircraft 1 can achieve when the airbrakes are pulled in, as a function of the minimum $P_{min}^V$ and maximum $P_{max}^V$ thrusts. These values $\gamma^*_{min}$ and $\gamma^*_{max}$ are equal to the minimum $\gamma_{sol\ min}$ and maximum $\gamma_{sol\ max}$ ground gradients that can be achieved by the aircraft 1 at a constant conventional speed $V_c$. The processor also determines the minimum pseudo-total gradient value $\gamma^*_{min\ AI}$ allowing the deicing system to operate.

Moreover, the processor calculates the minimum pseudo-total gradient value $\gamma^*_{min\ AF}$ that can be achieved when all of the airbrakes are out, at minimum thrust $P_{min}^V$. Thus, $\gamma^*_{min\ AF}$ is less than $\gamma^*_{min}$, and the range of reachable pseudo-total gradients is $\lfloor \gamma^*_{min\ AF}, \gamma^*_{max} \rfloor$.

The processor also calculates the minimum and maximum values of the pseudo-total gradients with current airbrakes (brought out by the pilot), $\gamma^*_{min\ AFc}$ and $\gamma^*_{max\ AFc}$, respectively.

Advantageously, steps 20 and 22 are done continuously, throughout the entire flight duration of the aircraft 1.

In a step 25 for displaying information, also continuous, the processor 16 transmits, to the information display device 13, the current ground gradient $\gamma_{sol}$ and the current pseudo-total gradient $\gamma^*$ of the aircraft 1, determined during step 20, as well as the range $\lfloor \gamma^*_{min\ AF}, \gamma^*_{max} \rfloor$ of the pseudo-total gradients determined during step 22. All of this information is represented by the information display device 13.

The pilot therefore has access to all of this information, and depending on the desired pseudo-total gradient for the aircraft 1, acts on the control member 10, during a step 28 for developing the instruction, to order a pseudo-total gradient $\gamma^*_{com}$, in the interval $\lfloor \gamma^*_{min\ AF}, \gamma^*_{max} \rfloor$, from the system 4. The movement of the control member 10 is transmitted to the processor 16, which determines the value $\gamma^*_{com}$ of the pseudo-total gradient ordered by this movement.

In parallel, the processor 16 transmits this value $\gamma^*_{com}$ to the information display device 13, and the information display device 13 displays this value $\gamma^*_{com}$ continuously, such that the pilot knows, when he acts on the control member 10, how the ordered pseudo-total gradient $\gamma^*_{com}$ varies.

The processor 16 then determines, in a step 30, the thrust $P_{com}^V$ that must be generated by the engines to achieve this instruction $\gamma^*_{com}$. The engine instruction, resulting from $P_{com}^V$, is set once the pilot releases the control member 10. The processor 16 also determines, as a function of this ordered thrust $P_{com}^V$ and any variations of the drag $T^V$ exerted on the aircraft 1, the corresponding order $P_{ordre}^V$ that must be given to the engines 5, and transmits that order to the engines 5.

In response to that order, the engines deliver, in a step 31, the requested thrust. Steps 20 for determining the current pseudo-total gradient and 25 for displaying being done continuously, the pilot can directly view how the current pseudo-total gradient $\gamma^*$ is varying in response to the instruction $\gamma^*_{com}$.

Figure 4:
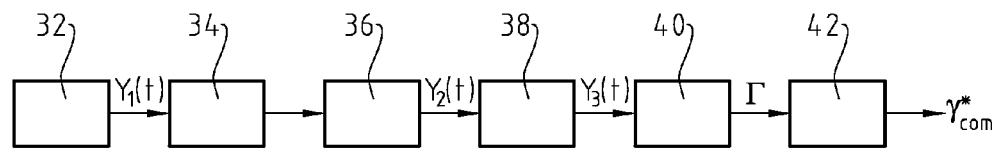
FIG. 4 illustrates a step for ordering an energy variation of the aircraft according to one embodiment of the invention.
Figure 5:
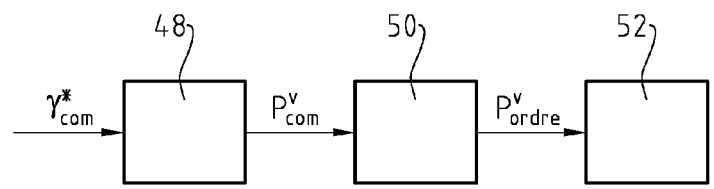
FIG. 5 illustrates a step for determining a thrust force that must be generated by the aircraft's engines according to one embodiment of the invention.

FIGS. 4 and 5 show steps 28 and 30 for developing the instruction and determining the thrust that must be generated by the engines according to a particular embodiment of the invention, in which the pilot is responsible for the deflection of the airbrakes.

In step 32 (FIG. 4), the pilot orders the variation of the pseudo-total gradient by moving the joystick 10 between the two stop positions $Y_{max}$ and $Y_{min}$, between a moment $t_0$ and a moment $t_f$, and the processor 16 determines, from position $Y_1(t)$ of the joystick, the value of the pseudo-total gradient ordered.

To that end, in a step 34, the position $Y_1(t)$ is normalized between $-1$ and $1$, the values $1$ and $-1$ respectively corresponding to positions $Y_{max}$ and $Y_{min}$ of the joystick, and the value $0$ to the central position. In step 36, a nonlinear and increasing function f, producing a bijection of interval $[-1,1]$ on interval $[-1,1]$—for example a cube function—is applied to the normalized position, such that small variations of the pseudo-total gradient can be controlled precisely, while also allowing strong variations of the pseudo-total gradient when the position of the joystick 10 is close to the stops.

A multiplicative factor $C_1$ is applied in 38 to the position $Y_2(t)$ obtained at the end of step 36. This multiplicative factor $C_1$, equal to the maximum proportion of the range of pseudo-total gradients $\lfloor \gamma^*_{min\ AFc}, \gamma^*_{max\ AFc} \rfloor$ that can be scanned in one second, determines the maximum variation speed of the ordered pseudo-total gradient, according to the equation:

$$\dot{\gamma}^*_{com\ max} = C_1 \cdot (\gamma^*_{max\ AFc} - \gamma^*_{min\ AFc}) \qquad (8)$$

The position $Y_3(t)$ obtained at the end of step 38 therefore verifies:

$$\dot{\gamma}^*_{com}(t) = Y_3(t) \cdot (\gamma^*_{max\ AFc} - \gamma^*_{min\ AFc}) \qquad (9)$$

In 40, the proportion $\Gamma$ of pseudo-total gradient ordered in the range $\lfloor \gamma^*_{min\ AFc}, \gamma^*_{max\ AFc} \rfloor$ is determined by integrating $Y_3(t)$ between $t_0$ and $t_f$, a clipping ensuring that the value obtained by integration is between 0 and 1. Then, in 42, the corresponding ordered pseudo-total gradient value $\gamma^*_{com}$ is calculated, according to the equation:

$$\gamma^*_{com} = \Gamma \cdot (\gamma^*_{max\ AFc} - \gamma^*_{min\ AFc}) + \gamma^*_{min\ Afc} \qquad (10)$$

FIG. 5 illustrates step 30 for the determination, by the processor 16, of the order to be applied to the engines 5 of the aircraft 1, as a function of the instruction $\gamma^*_{com}$ determined in step 28.

The thrust $P_{com}^V$ can be expressed, from expression (6), by:

$$P_{com}^V = mg \cdot \left(1 + \frac{V_{sol}}{g} \cdot K'\right) \cdot \gamma^*_{com} + T^V \qquad (11)$$

where $T^V$ is the current speed axis drag and $$K' = \left(\frac{\partial V_{air}}{\partial z}\right)_{V_c = cste}. \qquad (12)$$

Moreover, the minimum $P_{min}^V$ and maximum $P_{max}^V$ thrusts delivered by the engines are respectively equal to:

$$P_{min}^V = mg \cdot \left(1 + \frac{V_{sol}}{g} \cdot K'\right) \cdot \gamma^*_{minAFc} + T^V \qquad (13)$$

and $$P_{max}^V = mg \cdot \left(1 + \frac{V_{sol}}{g} \cdot K'\right) \cdot \gamma^*_{maxAFc} + T^V. \qquad (14)$$

Thus, at a constant drag $T^V$, the ordered speed axis thrust $P_{com}^V$ is equal to:

$$P_{com}^V = \frac{\gamma^*_{com} - \gamma^*_{minAFc}}{\gamma^*_{maxAFc} - \gamma^*_{minAFc}} \cdot (P_{max}^V - P_{min}^V) + P_{min}^V \qquad (15)$$

The processor 16 therefore calculates, in 48, according to this expression, and from values $\gamma^*_{min\,AFc}$ and $\gamma^*_{max\,AFc}$ determined during step 22 of the method, the engine instruction value $P_{com}^V$.

Step 48 is done continuously during the movement of the joystick 10 by the pilot, and the engine instruction resulting from $P_{com}^V$ is set once the ordered pseudo-total gradient $\gamma^*_{com}$ is no longer evolving.

For the thrust $P_{com}^V$ to effectively make it possible to achieve the ordered pseudo-total gradient $\gamma^*_{com}$, it is necessary for the value of the drag $T^V$ to remain constant after movement of the joystick 10. However, variations of the drag $T^V$ can appear after this movement, in particular related to the changes in the configuration of mobile surfaces of the aircraft (e.g. leading edge slats, high-lift flaps, and landing gear) and the drag caused by the modification of the vertical axis acceleration.

In order to compensate these drag variations, during a step 50, the processor 16 estimates the drag variation $\Delta T^V$ generated by such configuration changes, from a drag model, and calculates the thrust $P_{ordre}^V$ that must effectively be delivered by the engines, equal to:

$$P_{ordre}^V = P_{com}^V + \Delta T^V \tag{16}$$

The other causes of drag changes are not subject to compensation.

In step 52, the processor 16 generates an order intended for the engines so that they deliver the thrust $P_{ordre}^V$ and a low-pass filter is applied to said engine order so as to limit excessively quick variations by the latter.

It is thus understood from FIG. 5 how the processor generates, from the ordered pseudo-total gradient $\gamma^*_{com}$, the order to be applied to the engines.

Figure 6:
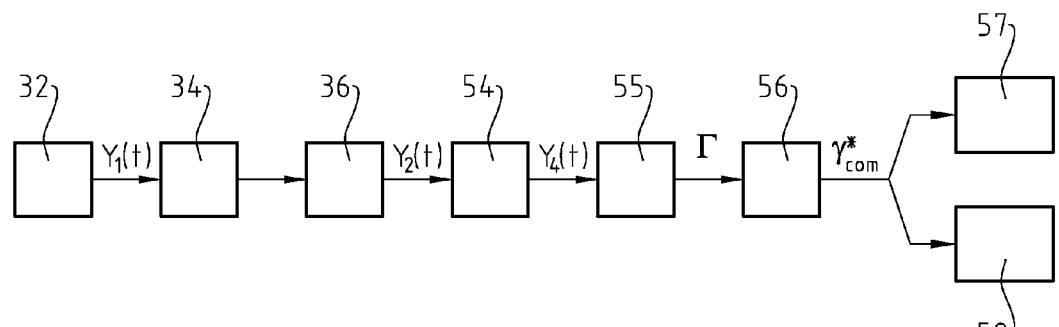
FIG. 6 illustrates the steps for developing the instructions and determining the thrust that must be generated by the engines according to another embodiment of the invention.

FIG. 6 illustrates steps 28 and 30 in one particular embodiment of the invention according to which the deflection of the airbrakes is done by the system.

To control the pseudo-total gradient of the aircraft 1, in step 32 the pilot moves the joystick 10, between a moment $t_0$ corresponding to a null ordered pseudo-total gradient and a moment $t_f$ at which the pilot releases the joystick 10, which returns to the central position.

According to the embodiment shown in FIG. 4, during the movement of the joystick 10, its position $Y_1(t)$ is transmitted to the processor 16, which in step 34 normalizes this position between –1 and 1, and in step 36 applies a nonlinear function f to the normalized position.

In step 54, a multiplicative factor $C'_1$ is applied to the position $Y_2(t)$ obtained at the end of the preceding step. This multiplicative factor $C'_1$, equal to the maximum proportion of the range of pseudo-total gradients $\lfloor \gamma^*_{min\,AF}, \gamma^*_{max} \rfloor$ that can be scanned in one second, determines the maximum variation speed of the ordered pseudo-total gradient, according to the equation:

$$\dot{\gamma}^*_{com\,max} = C'_1 \cdot (\gamma^*_{max} - \gamma^*_{min\,AF}) \tag{17}$$

The position $Y_4(t)$ obtained at the end of step 54 therefore verifies:

$$\dot{\gamma}^*_{com}(t) = Y_4(t) \cdot (\gamma^*_{max} - \gamma^*_{min\,AF}) \tag{18}$$

The proportion $\Gamma$ of ordered pseudo-total gradient in the range $\lfloor \gamma^*_{min\,AF}, \gamma^*_{max} \rfloor$ is then determined in step 55 by integrating $Y_4(t)$ between $t_0$ and $t_f$, a clipping ensuring that the value obtained by integration is between 0 and 1. Then, the corresponding ordered pseudo-total gradient value $\gamma^*_{com}$ is calculated in 56, according to the equation:

$$\gamma^*_{com} = \Gamma \cdot (\gamma^*_{max} - \gamma^*_{min\,AF}) + \gamma^*_{min\,AF} \tag{19}$$

If $\gamma^*_{com} > \gamma^*_{min}$, the airbrakes remain pulled in and the calculation of the thrust is done in step 57 according to the equation:

$$P_{com}^V = \frac{\gamma^*_{com} - \gamma^*_{min}}{\gamma^*_{max} - \gamma^*_{min}} \cdot (P_{max}^V - P_{min}^V) + P_{min}^V. \tag{20}$$

If $\gamma^*_{com} \leq \gamma^*_{min}$, then $P_{com}^V = P_{min}^V$ and the drag the airbrakes must generate is determined by the equation:

$$T_{AF}^V = -\frac{\gamma^*_{com} - \gamma^*_{min}}{\gamma^*_{max} - \gamma^*_{min}} \cdot (P_{max}^V - P_{min}^V) \tag{21}$$

Thus, in step 58, this need for additional drag generated by the airbrakes is converted into airbrake deflection owing to a nonlinear law.

Lastly, the deflection order of the airbrakes is sent by the system to the actuator of the airbrakes.

Figure 7:
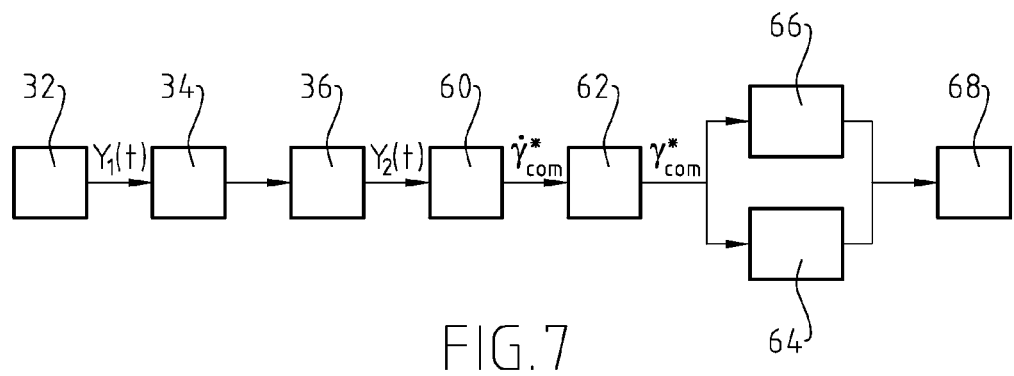
FIG. 7 illustrates the steps for developing the instructions and determining the thrust that must be generated by the engines according to another embodiment of the invention.

FIG. 7 illustrates steps 28 and 30 for developing the instruction and determining the thrust that must be generated by the engines according to another embodiment of the invention. In this same embodiment, the calculation of the engine order is done in a closed loop, using a coupling based on the comparison between the ordered $\gamma^*_{com}$ and current $\gamma^*$ pseudo-total gradients, the airbrakes being manually actuated again by the pilot.

To control the pseudo-total gradient of the aircraft 1, in step 32 the pilot moves the joystick 10, between a moment $t_0$ corresponding to a null ordered pseudo-total gradient and a moment $t_f$ at which the pilot releases the joystick 10, which returns to the central position.

According to the embodiment shown in FIG. 4, during the movement of the joystick 10, its position $Y_1(t)$ is transmitted to the processor 16, which in step 34 normalizes this position between –1 and 1, and in step 36 applies a nonlinear function f to the normalized position.

The position $Y_2(t)$ thus obtained is multiplied, in step 60, by a factor $C_2$, equal to the maximum variation speed $\dot{\gamma}^*_{com\,max}$ of the ordered pseudo-total gradient when the joystick is in position $Y_{max}$. The value obtained at the end of step 66 is therefore the variation speed $\dot{\gamma}^*_{com}$ of the ordered pseudo-total gradient corresponding to the position $Y_1(t)$ of the joystick.

The value $\gamma^*_{com}$ of the ordered pseudo-total gradient is then determined continuously during a step 62 by integrating $\dot{\gamma}^*_{com}$ between $t_0$ and $t_f$, by applying a clipping so as to confine $\gamma^*_{com}$ between $\gamma^*_{min\,AFc}$ and $\gamma^*_{max\,AFc}$.

The processor 16 then controls the thrust delivered by the engines 5, as a function of the deviation between the ordered $\gamma^*_{com}$ and current $\gamma^*$ pseudo-total gradients, according to a proportional and integral (PI) regulation, which makes it possible to regulate the thrust of the engines both quickly and precisely.

Thus, in step 64, the processor 16 determines a first thrust $P_{com1}^V$, according to the equation:

$$P_{com1}^V = K_1 \cdot mg\left(1 + \frac{V_{sol}}{g} K'\right)(\gamma^*_{com} - \gamma^*) + P^V \tag{22}$$

where $K_1$ is the gain of the proportional regulation.

In parallel, in step 66 the processor develops a second thrust $P_{com2}^V$ whereof the variation speed is proportional to the deviation ($\gamma^*_{com}-\gamma^*$), according to an integral regulation. Thus:

$$P_{com2}^V = K_2 \cdot \int (\gamma^*_{com} - \gamma^*) \quad (23)$$

where $K_2$ is the gain of the integral regulation.

This thrust $P_{com2}^V$, added to the first thrust $P_{com1}^V$, makes it possible to reduce the static error that could remain if only the thrust $P_{com1}^V$ was ordered to the engines.

In step 68, the processor 16 develops, from the thrust $P_{ordre}^V = P_{com1}^V + P_{com2}^V$ an engine order, applies, to said engine order, a low-pass filter to avoid excessively rapid variations of said engine order, and transmits the obtained order to the engines 5.

Thus, in this embodiment, the engine order generated by the processor 16 adapts at all times to any changes in flight conditions, which makes it possible in particular to compensate drag variations due for example to the high-lift flaps deploying.

Figure 8:
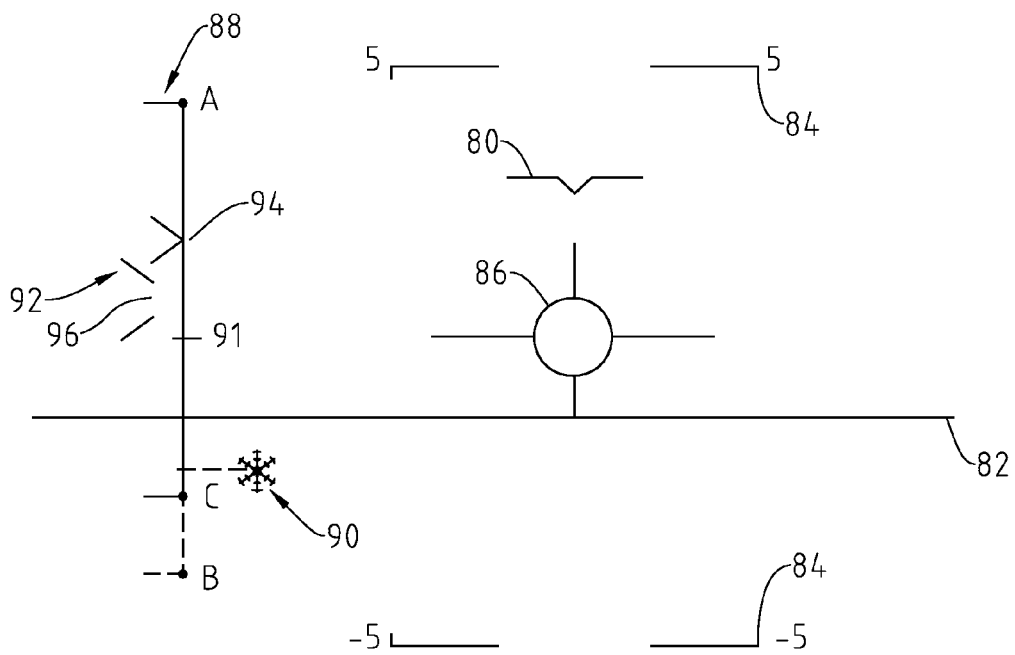
FIG. 8 illustrates a form of representation by a device for displaying information relative in particular to the aircraft's energy when the airbrakes are not out, according to one embodiment.
Figure 9:
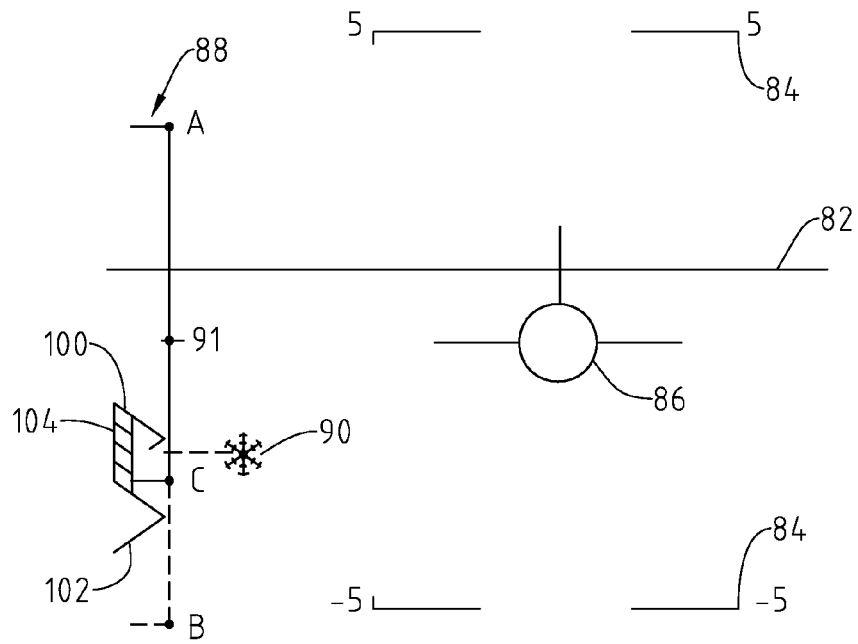
FIG. 9 illustrates a form of representation by a device for displaying information relative in particular to the aircraft's energy when the airbrakes are not out, according to one embodiment.

FIGS. 8 and 9 illustrate a form of representation, by the information display device 13, of information relative in particular to the energy of the aircraft, according to one particular embodiment, in two flight configurations of the aircraft 1.

FIG. 8 illustrates the display of this information in a configuration in which the airbrakes are pulled in. The information display device 13 comprises a viewing device dedicated to the handling of the aircraft. FIG. 8 thus shows information projected on that screen, displayed in the form of symbols, during the implementation of the inventive method.

These symbols in particular include a symbol 80 that is a model of the aircraft, occupying a fixed position on the screen, which materializes a projection to infinity of the longitudinal axis of the aircraft 1, and an artificial skyline 82, at the center of a graduated gradient scale 84. This artificial skyline 82 is therefore inclined when the bank angle of the aircraft 1 is not null, during turning. A speed vector symbol 86 of the aircraft indicates the speed vector of the aircraft 1, the deviation between the artificial skyline 82 and the speed vector symbol 86 of the aircraft representing the ground gradient $\gamma_{sol}$ of the aircraft.

Moreover, a pseudo-total gradient scale 88, shown in the form of a segment extending between two points A and B, indicates the range of the pseudo-total gradients $[\gamma^*_{min\ AF}, \gamma^*_{max}]$ that the aircraft 1 can achieve, determined during step 22 of the inventive method. This scale 88, laterally offset relative to the airplane symbol 80 of the aircraft, preferably stays perpendicular to the artificial skyline 82, and is therefore inclined when the aircraft 1 is turning. The length of the segment [AB] corresponds to ($\gamma^*_{max} - \gamma^*_{min\ AF}$) according to the graduated gradient scale 84. Thus, the same scale is used to represent the ground gradient of the aircraft and the range of achievable pseudo-total gradients.

A first part of the segment 88, represented by a solid line that extends between two points A and C, indicates the range of pseudo-gradients that can be achieved when the airbrakes are pulled in. Point A thus shows the maximum pseudo-total gradient $\gamma^*_{max}$ that can be achieved, when the thrust of the engines is maximal (according to the system's authority) and the airbrakes are pulled in, and point C represents the minimum pseudo-total gradient $\gamma^*_{min}$, in particular reached when the thrust of the engines is minimal and the airbrakes are pulled in.

A second part of the segment 88, represented by a broken line that extends between points B and C, indicates that the range of pseudo total gradients $[\gamma^*_{min\ AF}, \gamma^*_{min}]$ that can be achieved only when all of the airbrakes are deployed. Point B thus corresponds to the minimum pseudo-total gradient $\gamma^*_{min\ AF}$, obtained when the thrust from the engines is minimal (according to the system's authority) and all of the airbrakes are out.

Several symbols are superimposed on this scale 88. A symbol 90, arranged between points A and B, indicates the pseudo-total gradient obtained for $P=P_{min\ Al}^V$, and therefore corresponds to the minimum pseudo-total gradient $\gamma^*_{min\ Al}$ that can be achieved by a decrease of the thrust of the engines while allowing the operation of the deicing system.

A reference marker 91, aligned on the speed vector symbol 86 of the aircraft, also indicates the pseudo-total gradient making it possible to fly at a constant conventional speed. This reference pseudo-total gradient is equal to the current ground gradient $\gamma_{sol}$ of the aircraft.

The current $\gamma^*$ and ordered $\gamma^*_{com}$ pseudo-total gradients are shown along this scale of the gradients 88, using a symbol 92, in the form of a chevron, made in two parts:

a head 94 indicates the pseudo-total gradient $\gamma^*_{com}$ ordered by the pilot. During step 28 for developing the instruction, the head 94 of the chevron moves continuously as long as the joystick 10 is spaced away from its central position;

a body 96, made up of two sections, continuously indicates the current pseudo-total gradient $\gamma^*$, as determined during step 20.

These two parts 94 and 96 are therefore separated when the current $\gamma^*$ and ordered $\gamma^*_{com}$ pseudo-total gradients are not equal, according to the configuration shown in FIG. 8, and aligned when the current $\gamma^*$ and ordered $\gamma^*_{com}$ pseudo-total gradients are equal.

Thus, when the pilot wishes to modify the pseudo-total gradient of the aircraft, he moves the joystick 10 and views the variation of the ordered pseudo-total gradient $\gamma^*_{com}$, indicated by the head 94 of the chevron 92. When the joystick 10 returns to its central position, the position of the head 94 of the chevron 92 is fixed. Then, during the modification of the thrust of the engines in response to the order developed in step 30 of the inventive method, the current pseudo-total gradient $\gamma^*$ varies, and the body 96 of the chevron 92 tends to align on the head 94.

FIG. 9 illustrates the display of information relative in particular to the energy of the aircraft in a configuration in which the airbrakes are deployed. This display is similar to the display illustrated in FIG. 8, with the exception of the symbol indicating the ordered and current pseudo-total gradients. Thus, the elements similar to those of FIG. 8 bear the same numbers.

When the airbrakes are deployed, the indication of the ordered and current pseudo-total gradients is made using two symbols:

a first symbol 100, for example in the form of a chevron whereof one of the legs is truncated, indicates the pseudo-total gradient that would be obtained if the airbrakes were pulled in. This symbol is therefore situated between points A and C of the scale 88. It in particular allows the pilot to know whether the thrust delivered by the engines is greater or less than the thrust $P_{min\ Al}^V$ allowing the operation of the deicing system. It takes the place of symbol 96 when the airbrakes are deployed.

a second symbol 102, in the form of a chevron, indicates the current pseudo-total gradient $\gamma^*$, according to the representation of FIG. 8, taking into account the airbrakes 6 being deployed.

These symbols 100 and 102 are preferably connected by a band 104, the length of which indicates the variation of the pseudo-total gradient generated by the airbrakes 6 being deployed.

This embodiment therefore makes it possible to indicate to the pilot both the pseudo-total gradient that would be obtained if the airbrakes 6 were pulled in, representative of the thrust $P^V$ delivered by the engines 5, and the pseudo-total gradient obtained with the same thrust $P^V$, when the airbrakes 6 are deployed.

Thus, when the airbrakes are deployed, and the pseudo-total gradient of the aircraft 1 is less than $\gamma^*_{min\ Al}$, the pilot can know whether the thrust $P^V$ delivered by the engines 5 is greater or less than $P_{min\ Al}^V$. Indeed, it may be desirable to deploy the airbrakes when the thrust delivered by the engines is not minimal, and greater than $P_{min\ Al}^V$, in order to authorize the operation of the deicing system.

According to other embodiments of the display device, the symbols can assume forms different from those illustrated in FIGS. 8 and 9. Two alternative embodiments of symbols indicating the current $\gamma^*$ and ordered $\gamma^*_{com}$ pseudo-total gradients are shown in FIGS. 10 and 11.

Figure 10:
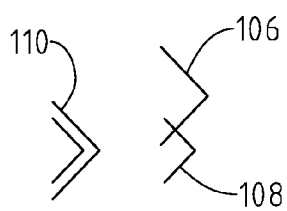
FIGS. 10 and 11 illustrate alternative representations of the energy variation of the aircraft.

Thus, FIG. 10 illustrates an embodiment of these pseudo-total gradients, using two distinct chevrons 106 and 108, respectively indicating the ordered $\gamma^*_{com}$ and current $\gamma^*$ pseudo-gradients, overlapping to form the symbol 110 when these pseudo-gradients are equal.

Figure 11:
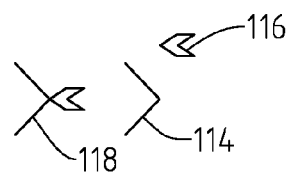

FIG. 11 illustrates another embodiment of the current $\gamma^*$ and ordered $\gamma^*_{com}$ pseudo-total gradients, in which the current pseudo-total gradient $\gamma^*$ is indicated by a chevron 114, and the ordered pseudo-total gradient $\gamma^*_{com}$ by a symbol 116 in the form of an arrow, the tip of which is oriented towards the tip of the chevron 114. When these pseudo-total gradients are equal, these two symbols 114 and 116 are aligned, forming the symbol 118.

Moreover, the scale 88 of the pseudo-total gradients is not necessarily perpendicular to the artificial skyline 82, and can remain fixed in the viewing screen when the bank angle is not null, during turning.

Figure 12:
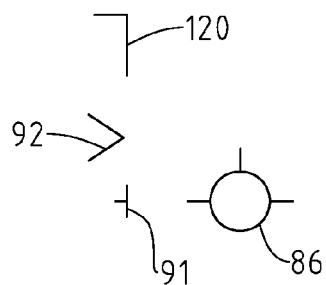
FIG. 12 illustrates an alternative representation of the energy variation range that can be achieved by the aircraft.

According to another embodiment, illustrated in FIG. 12, the range of the achievable pseudo-total gradients can be shown by the broken segment 120. This range could also be shown not to the left of the speed vector symbol 86 of the aircraft, but to the right.

More generally, the scale 88 of the pseudo-gradients as well as the symbols 90, 91, 92, 100, 102 and 104 can be traced independently of the graduated gradient scale 84. In particular, the length of the segment [AB] can be fixed. Numerical values can be presented at the ends of the segment [AB] to indicate the values corresponding to $\gamma^*_{max}$ and $\gamma^*_{min\ AF}$.

Moreover, in order to limit the visual clutter, the scale of the pseudo-total gradients can be masked when information relative to the pseudo-total gradient is not necessary for the pilot, for example when the current pseudo-total gradient is stable and equal to the ordered pseudo-total gradient.

According to one embodiment, the current pseudo-total gradient of the aircraft and its position in the range of achievable pseudo-total gradients can then be recalled to the pilot using a secondary scale of pseudo-total gradients, advantageously displayed in a corner of the screen of the display device, in order not to clutter the screen.

Figure 13:
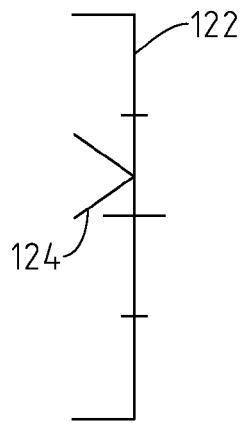
FIGS. 13, 14 and 15 show three forms of displaying information relative to the energy of the aircraft.
Figure 14:
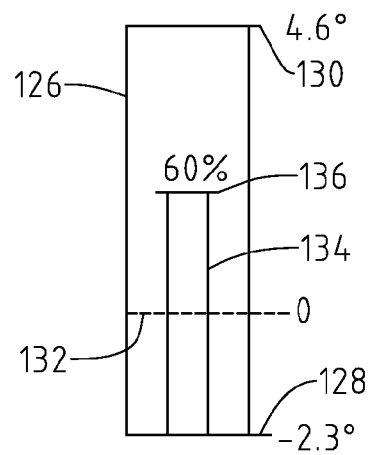
Figure 15:
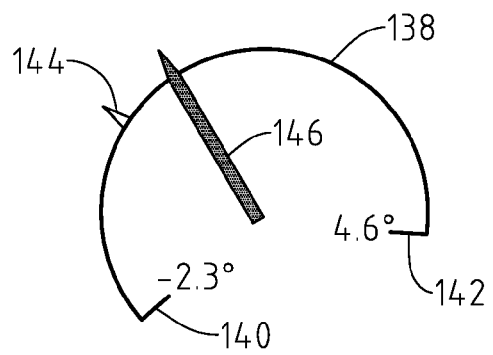

FIGS. 13, 14 and 15 thus illustrate how this secondary scale is represented by the display device 13, according to three embodiments.

According to an embodiment illustrated in FIG. 13, this scale is illustrated by a graduated segment 122, corresponding to the range of achievable pseudo-total gradients, and the current pseudo-total gradient $\gamma^*$ is shown by a chevron 124.

FIG. 14 illustrates another embodiment of the display of the secondary scale, according to which the range of achievable pseudo-total gradients is shown by a first vertical bar 126, numerical values 128 and 130 at two opposite ends of this rectangle respectively indicating the minimum and maximum values of achievable pseudo-total gradients, and a broken line 132 showing the null value of the pseudo-total gradient. A second vertical bar 134, contained in the first bar 126, indicates the current pseudo-total gradient level $\gamma^*$ of the aircraft, and a numerical indication 136 specifies the value of this current pseudo-total gradient, in percentage of the achievable range.

According to another embodiment illustrated in FIG. 15, the range of achievable pseudo-total gradients is shown by a gauge 138 in arc-of-circle form, at the ends of which two numerical indications 140 and 142 respectively indicate the minimum and maximum achievable values of the pseudo-total gradient. A symbol 144, arranged along the arc of circle, indicates the null value of the pseudo-total gradient, and a symbol 146 in the form of a needle indicates the current pseudo-total gradient $\gamma^*$.

The method and the system according to the invention thus allow the pilot to control the energy variation of the aircraft. In particular, the pilot knows at all times, owing to the display device, the energy variation range achievable by the aircraft, without having to interpret several signals shown on various dials. It must, however, be understood that the method and the system according to the invention are independent of the display device described, and can be implemented with other types of display devices.

It must also be understood that the embodiments presented above are not limiting. In particular, the ordered size, representative of the energy variation of the aircraft, is not necessarily the pseudo-total gradient, but can be the total gradient defined by expression (2) or any other size proportional to the pseudo-total gradient. Moreover, the expression of the pseudo-total gradient can involve speeds relative to the air other than the conventional speed Vc, for example the Mach M.

Thus, the new pseudo-total gradient in Mach becomes:

$$\gamma^* = \gamma_{sol} + \frac{\left(\frac{\partial V_{air}}{\partial M}\right)_{z=cste}}{1 + \frac{V_{sol}}{g} \cdot \left(\frac{\partial V_{air}}{\partial z}\right)_{M=cste}} \frac{\dot{M}}{g} \qquad (24)$$

which represents the ground gradient of the aircraft when its Mach M is constant.

Moreover, the pseudo-total gradient could also be defined relative to the air gradient $\gamma_{air}$ of the aircraft.

Moreover, the processor 16 can control, aside from the thrust of the engines and the deployment of the airbrakes, other elements of the aircraft, for example the ground brakes or the thrust reverser devices, capable of acting on the energy variation of the aircraft.

Moreover, the control member on which the pilot acts to order an energy variation of the aircraft can be a conventional lever, each position of the lever corresponding to a given energy variation.

Of course, other embodiments can be considered.

The invention claimed is:
1. A method for managing an energy variation of an aircraft provided with at least one propulsion system, capable of generating a thrust force on said aircraft comprised in a thrust range wherein said energy variation is expressed by a value representative of said energy variation and obtained from a total gradient of the aircraft, and comprises:

determining the current energy variation of said aircraft;

ordering an energy variation of the aircraft by ordering a desired amount of said value by actuating a control member;

determining, as a function of said ordered energy variation, a necessary thrust force that must be generated by said propulsion system for the energy variation of the aircraft to be able to tend towards said ordered energy variation;

developing and applying a control order to said propulsion system so that the propulsion system delivers said necessary thrust force.

2. The method for managing an energy variation of an aircraft according to claim 1, further comprising determining an energy variation range that can be achieved by the aircraft by modifying at least said thrust force generated by the propulsion system.

3. The method for managing an energy variation of an aircraft according to claim 2, further comprising displaying said current energy variation, said energy variation range that can be achieved by the aircraft, and said ordered energy variation.

4. The method for managing an energy variation of an aircraft according to claim 1, wherein the aircraft includes at least one braking system capable of exerting a drag force on said aircraft, and the method further comprising:

determining a necessary drag force that must be exerted by said braking system so that the energy variation of the aircraft can tend towards said ordered energy variation; and a step for developing and applying a control order to said braking system so that it generates said necessary drag force.

5. The method for managing an energy variation of an aircraft according to claim 2, wherein ordering the energy variation of the aircraft further comprises determining said ordered energy variation as a function of said actuation.

6. The method for managing an energy variation of an aircraft according to claim 5, wherein determining said ordered energy variation as a function of said actuation comprises:

determining a relative speed of variation of said ordered energy variation, as a function of said actuation;

determining an ordered energy variation proportion in said range upon said actuation;

determining said ordered energy variation from said ordered energy variation proportion.

7. The method for managing an energy variation of an aircraft according to claim 1, wherein determining said necessary thrust force comprises determining an ordered thrust force, which must be generated by said propulsion system so that the energy variation of the aircraft can tend towards said ordered energy variation, with a constant drag force, and determining a correction that must be made to said ordered thrust force to offset variations of the drag force exerted on the aircraft.

8. The method for managing an energy variation of an aircraft according to claim 1, wherein determining said necessary thrust force is carried out by means of a coupling based on the comparison between said ordered energy variation and said current energy variation.

9. The method for managing an energy variation of an aircraft according to claim 8, wherein said coupling is of the proportional and integral type.

10. A system for managing an energy variation of an aircraft provided with at least one propulsion system, capable of generating a thrust force on said aircraft comprised in a thrust range wherein said energy variation is expressed by a value representative of said energy variation and obtained from a total gradient of the aircraft, comprising:

means for determining the current energy variation of said aircraft;

means for ordering an energy variation of the aircraft by ordering a desired amount of a value representative of said energy variation and obtained from a total gradient of the aircraft;

means for determining, as a function of said ordered energy variation, a necessary thrust force that must be generated by said propulsion system so that the energy variation of the aircraft can tend towards said ordered energy variation;

means for developing and applying a control order to said propulsion system so that it delivers said necessary thrust force.

11. The system for managing an energy variation of an aircraft according to claim 10, further including means for determining an energy variation range that can be achieved by the aircraft by modifying at least said thrust force generated by the propulsion system.

12. The method according to claim 1, wherein said value is expressed as $\gamma^*$ wherein $$\gamma^* = \gamma_{sol} + \frac{\left(\frac{\partial V_{air}}{\partial V_c}\right)_{z=cste}}{1 + \frac{V_{sol}}{g} \cdot \left(\frac{\partial V_{air}}{\partial z}\right)_{V_c=cste}} \frac{\dot{V}_c}{g},$$

wherein:

conventional speed $V_c$, or Badin, is the aircraft speed measured by a perfect airspeed-graduated airspeed indicator under normal temperature and pressure conditions at a null altitude;

$\gamma_{sol}$ is the ground gradient of the aircraft;

$V_{sol}$ is the speed of the aircraft relative to the ground;

$V_{air}$ is the speed of the aircraft relative to the air; and

Z is an altitude coordinate.

13. The method according to claim 1, wherein said value is expressed as $\gamma^*$ wherein $$\gamma^* = \frac{N_x^{Vsol}}{1 + \left(\frac{\partial V_{air}}{\partial z}\right)_{V_c=cst} \cdot \frac{V_{sol}}{g}},$$

wherein:

$$N_x^{Vsol} = \frac{A_x^{Vsol}}{g}$$

designates the load factor supported by the speed of the aircraft relative to the ground, $A_x^{Vsol}$ designating the acceleration on the axis supported by the speed of the aircraft relative to the ground;

conventional speed $V_c$, or Badin, is the aircraft speed measured by a perfect airspeed-graduated airspeed indicator under normal temperature and pressure conditions at a null altitude;

$V_{sol}$ is the speed of the aircraft relative to the ground;

$V_{air}$ is the speed of the aircraft relative to the air; and

Z is an altitude coordinate.

14. The system according to claim 10, wherein said value is expressed as γ* wherein $$\gamma^* = \gamma_{sol} + \frac{\left(\frac{\partial V_{air}}{\partial V_c}\right)_{z=cste}}{1 + \frac{V_{sol}}{g} \cdot \left(\frac{\partial V_{air}}{\partial z}\right)_{V_c=cste}} \frac{\dot{V}_c}{g},$$

wherein:

conventional speed $V_c$, or Badin, is the aircraft speed measured by a perfect airspeed-graduated airspeed indicator under normal temperature and pressure conditions at a null altitude;

$\gamma_{sol}$ is the ground gradient of the aircraft;

$V_{sol}$ is the speed of the aircraft relative to the ground;

$V_{air}$ is the speed of the aircraft relative to the air; and

Z is an altitude coordinate.

15. The system according to claim 10, wherein said value is expressed as γ* wherein $$\gamma^* = \frac{N_X^{V_{sol}}}{1 + \left(\frac{\partial V_{air}}{\partial z}\right)_{V_c=cst} \cdot \frac{V_{sol}}{g}},$$

wherein:

$$N_X^{V_{sol}} = \frac{A_X^{V_{sol}}}{g}$$

designates the load factor supported by the speed of the aircraft relative to the ground, $A_X^{V_{sol}}$ designating the acceleration on the axis supported by the speed of the aircraft relative to the ground;

conventional speed $V_c$, or Badin, is the aircraft speed measured by a perfect airspeed-graduated airspeed indicator under normal temperature and pressure conditions at a null altitude;

$V_{sol}$ is the speed of the aircraft relative to the ground;

$V_{air}$ is the speed of the aircraft relative to the air; and

Z is an altitude coordinate.

\* \* \* \* \*